United States Patent [19]
Alfredsson et al.

[11] 3,726,199
[45] Apr. 10, 1973

[54] SHUTTER RELEASE MECHANISM OF PHOTOGRAPHIC CAMERAS, PREFERABLY PROVIDED WITH ROLLER-BLIND SHUTTER

[75] Inventors: Alf Ingvar Alfredsson, Savedalen; Paul Ingemar Nilsson, Floda, both of Sweden

[73] Assignee: Fritz Victor Hasselblad, Goteborg, Sweden

[22] Filed: Dec. 7, 1970

[21] Appl. No.: 95,636

[30] Foreign Application Priority Data

May 6, 1970 Sweden..............................6234/70

[52] U.S. Cl....................................95/53 EA, 95/57
[51] Int. Cl.................................................G03b 9/62
[58] Field of Search......................95/10 CT, 55, 57, 95/53 EA, 53 EB

[56] References Cited

UNITED STATES PATENTS

| | | |
|---|---|---|
| 3,526,180 | 9/1970 | Fahlengorg et al......................95/53 |
| 3,461,785 | 8/1969 | Ivester...............................95/55 X |
| 3,348,460 | 10/1967 | Schmitt..................................95/10 |
| 2,953,982 | 9/1960 | Anzai................................95/55 X |
| 3,450,015 | 6/1969 | Reimann et al. .........................95/10 |
| 3,512,000 | 5/1970 | Powell................................95/10 X |
| 3,568,582 | 3/1971 | Uchida et al. .......................95/10 X |

FOREIGN PATENTS OR APPLICATIONS 844,706  5/1952  Germany

*Primary Examiner*—John M. Horan
*Assistant Examiner*—Michael L. Gellner
*Attorney*—Sommers & Young

[57] ABSTRACT

A camera shutter of the focal plane shutter type having first and second shutter parts which are released individually with a controlled relative time difference to provide a gap between the shutter parts which is proportional to a preselected shutter speed. A separate electromagnetic release means is provided for each shutter part. Upon initiation of shutter operation, the electromagnetic release means for the first shutter part is energized and, at the same time, an electronic timing means is set into operation. At the end of the interval demarcated by the electronic timing means, the electromagnetic release means associated with the second shutter part is energized to release the second shutter part, thereby terminating the exposure period.

1 Claim, 4 Drawing Figures

SHUTTER RELEASE MECHANISM OF PHOTOGRAPHIC CAMERAS, PREFERABLY PROVIDED WITH ROLLER-BLIND SHUTTER

BACKGROUND OF THE INVENTION

This invention relates to photographic cameras with focal plane shutter, preferably of the roller-blind type, in which the first and second shutter parts are released individually with a controlled relative time difference, in such a manner, that between the shutter parts a gap is formed which is proportional to the shutter speed set at the camera. The invention, more precisely, comprises a separate electromagnetic release means for each of the shutter parts and an electronic timing means, at which an electric contact actuated by the release button of the camera releases the first shutter part and simultaneously starts the time delay circuit, which determines the shutter speed and releases the second shutter part. The invention can be applied to focal plane shutters of any type, irrespective of their equipment with curtain, blades or flaps. For reason of simplicity, the embodiment described in the following refers by way of example to a focal plane shutter of the roller blind type.

There is known in the prior art focal plane shutters which comprise an electronic time delay circuit and having a mechanical release means which, in many cases, manually opens the first shutter part in such a manner, that its movement directly or indirectly actuates a contact for starting the time delay circuit. The delay controls a holding magnet for actuating the second closing shutter part. As one example of a focal plane shutter of this kind, the mechanism disclosed in the Federal Republic of Germany document No. 1 260 970 can be mentioned. The relatively simple construction of a means of the kind described involves at the same time disadvantages restricting the application possibilities of the camera. Thus the electronic timing circuit is started in a mechanical way by the actuation of a contact spring by the opening shutter part; the length of the shutter speed will be less accurate, because the closing position of a contact spring is not sufficiently distinct to provide for the desired precision, which, moreover, rapidly deteriorates at a moderate rate of wear of the moving parts included in this mechanism. Also, the release of the electronic timing circuit in a mechanical way requires more time than to release it electrically, and consequently the shutter will have a longer reaction time. Moreover, the current consumption is higher when using a holding magnet consuming current during the entire exposure process, than by applying short current pulses for actuating electromagnetic interlocks for the shutter parts.

At certain technical and scientific photographing operations, for example in connection with artillery gunning, it must be possible to release the camera extremely rapidly upon a sound or light impulse. This is not possible with mechanically operated shutters, because too much time is required for transforming the amplified electric signal from a microphone or a photocell into a mechanical movement.

In cameras with electrically operated shutters, and possibly with an electronic light measuring system, but with manual film transport; the current is usually supplied by a so-called mercury battery of miniature size which is built into the camera. The small dimensions in relation to the battery's capacity constitute an advantage which, however, is counteracted by the fact that the required current magnitude from the battery for actuating the electromagnets controlling the shutter mechanism is limited by the relatively high inner battery resistance. It is, therefore, difficult, particularly toward the end of the life time of the battery, for this type of battery type to provide a current of sufficient magnitude to ensure proper operation of the electromagnets. Moreover, the battery is subject to easy damage when it is discharged with a high current amplitude.

SUMMARY OF THE INVENTION

According to the present invention, a shutter release mechanism is obtained which in a relatively simple way eliminates the aforesaid disadvantages. Each of the two shutter parts is provided given its own release means comprising a mechanical catch released by an electromagnet in response to a short current pulse. The entire exposure process is controlled by an electronic coupling, including circuits for time delay and for releasing the electromagnets of the shutter catches. The current source is a battery built into the camera, alternatively an external current source, which in a given case also feeds the light measuring means and possibly also the film transport mechanism. For ensuring safe operation of the electromagnets and for conserving the battery, the current pulses are supplied from capacitors which are charged by the battery via current limiting resistances. The exposure is started by a contact built into the camera which energizes an electronic circuit when the contact closed by the release button of the camera or by a movement derived therefrom. Upon closure of this contact, the electromagnet for the first shutter part receives a short current pulse and releases the catch, thereby starting the movement of this first shutter part. The contact at the same time starts the time delay circuit controlling the electromagnet which actuates the second shutter part. The time delay corresponding to the set exposure time having passed, the drive circuit for the electromagnet of the second shutter part is initiated. Said electromagnet thereby receives a short current pulse and releases the catch, so that the second shutter part begins to move and completes the exposure. The release mechanism of the second shutter part at the same time interrupts the current to the time delay circuit by means of a contact and thus prevents said circuit from unnecessarily consuming current when the shutter is released. Owing to the fact that the contact actuated by the camera release button releases the first shutter part and simultaneously starts the time delay circuit, high precision and a short reaction time of the mechanism are obtained. The moving parts included in the mechanism are relatively few in number and simple, and they can be designed so as not appreciably to deteriorate the precision achieved by the electronic mechanism parts which have a high stability and a long life. By connecting an external microphone- or photocell-controlled electric pulse generator in parallel with the contact actuated by the camera release button, the shutter can be released sufficiently rapidly by a sound or light signal. When the camera is desired to be released by remote control, the external impulse generator may be a switch.

BRIEF DESCRIPTION OF THE DRAWINGS

In the following, an embodiment of the invention is described; in which the focal plane shutter is of the roller blind type. Reference is thereby made to the accompanying drawings in which.

DETAILED DESCRIPTION OF THE PREFERRED EMBODIMENT

Figure 1:
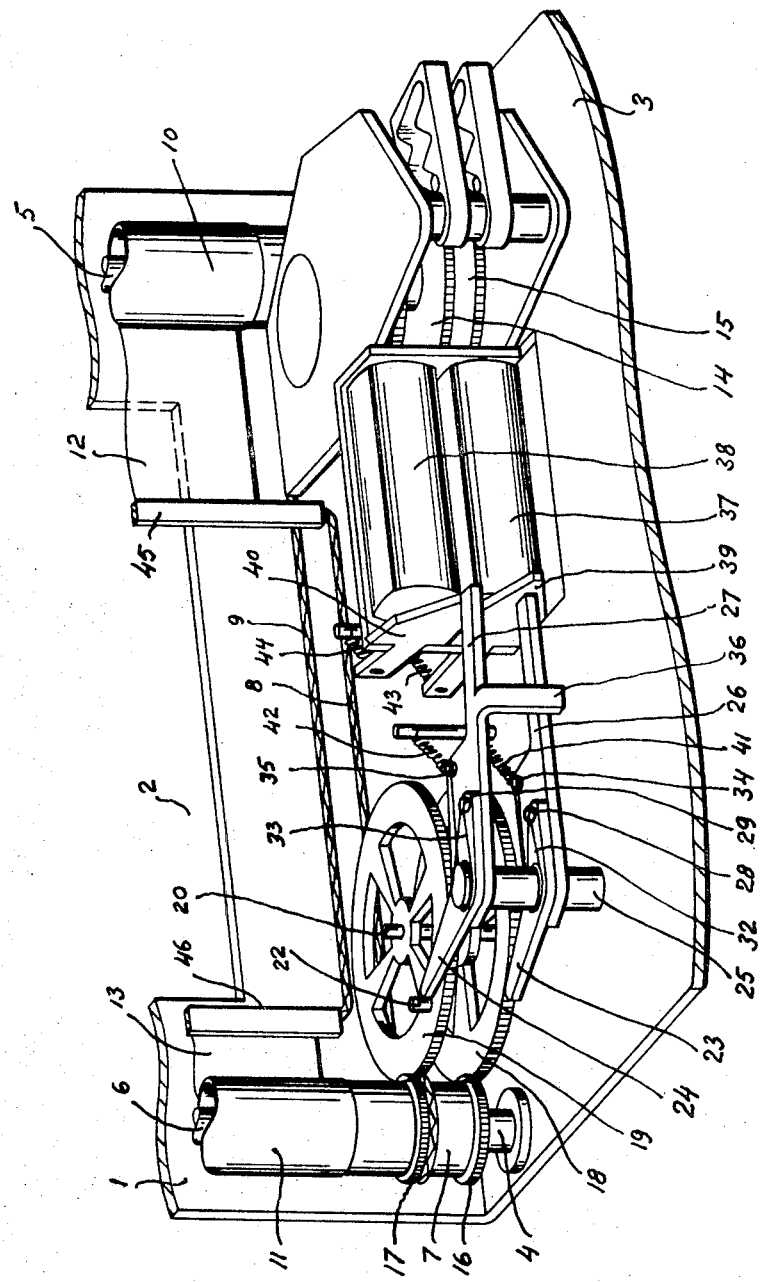
FIG. 1 shows a view of the invention seen obliquely from above and of roller blind mechanism parts coacting therewith.

In FIG. 1, the focal plane shutter of curtain type is mounted near the rear side 1 of the camera body in front of the film gate 2. On each side of the film gate 2 a concentric pair of axles are provided for winding thereon and there-off the curtain parts and their drawing means. In the Figure, the right-hand axle pair are driven and the left-hand axle pair are actuated by a locking mechanism. The driving and locking mechanisms are assembled on the bottom 3 of the camera body which also serves as a mounting of lower bearings 4 for inner axles 5, 6 mounted in the same way in the upper part (not shown) of the camera body. Said inner axles 5, 6 are provided closest to the bearings with drums 7 for the drawing means 8, 9 of the curtain parts. Between said drums 7, on the inner axles 5, 6, outer axles 10, 11 are mounted. The first curtain part 12 is attached to the right-hand outer axle 10, and its drawing means 8 is attached to the drums 7 on the left-hand inner axle 6. The second curtain part 13 is attached to the left-hand outer axle 11, and its drawing means 9 is attached to the drums 7 (covered in FIG. 1) on the right-hand inner axle 5. The axles 5 and 10 are provided with stationary gear rings (covered in FIG. 1) engaging with the gear rings on spring-motors 14 and 15, respectively, driving the first curtain part 12 and the second curtain part 13, respectively. In a corresponding way, the axles 6 and 11 are provided with stationary gear rings 16 and 17, respectively, engaging with ratchet wheels 18 and 19, respectively, for the curtain parts 12 and 13, respectively.

The ratchet wheels 18, 19 are mounted on an axle 20 and are provided with stop pins 21 and 22, respectively, against which in locked position catches 23 and 24, respectively, rest. Said catches 23, 24 as well as levers 26 and 27, respectively, coacting therewith are mounted on an axle 25. For cocking the shutter mechanism, which is not concerned by this invention, a certain movability between the catches 23, 24 and the levers 26 and 27, respectively, is required. For this reason, the catches 23, 24 are provided with guide pins 28 and 29, respectively, which with their lower portion guide in grooves 30, 31 in the levers 26 and 27, respectively, and the upper portion of which forms a holder for hairpin springs 32 and 33, respectively, enclosing the axle 25 and, respectively, resting with their other end against pins 34 and 35, respectively. For cocking the shutter mechanism also a cam 36 on the lever 27 is utilized. The free ends of the levers 26, 27 rest in locked position against the points of armatures 39 and 40, respectively, associated with electromagnets 37 and 38, respectively, at which points they are retained by tension springs 41 and 42, respectively. The armatures 39, 40 are held in their positions in a corresponding way by armature springs 43 and 44, respectively, as long as the electromagnets 37 and 38, respectively, are deenergized.

Figure 2:
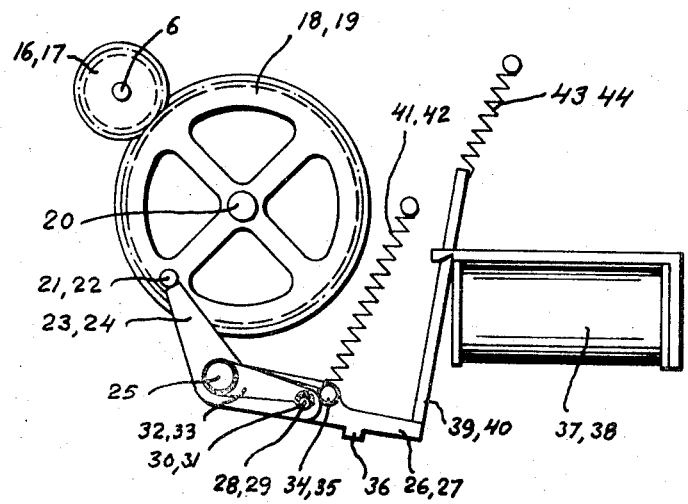
FIG. 2 shows the electromechanical locking mechanism for the roller blind mechanism parts prior to the exposure.

In the cocked position of the curtain shutter the second curtain part 13 is wound on the outer axle 11, and the first curtain part 12 covers the film gate 2, extending with its edge 45 such a distance to the edge 46 of the second curtain part 13, that a relatively narrow gap is formed, which gap corresponds to the shortest shutter speed obtained when the two curtain parts are released with a difference in time as short as permitted by the time delay circuit. With the shutter cocked as shown in FIG. 2, both locking mechanisms are in locked position. At all shutter speeds, except for the fastest one, the first curtain part 12 is released first, whereafter with a time delay corresponding to the selected shutter speed the second curtain 13 is released.

Figure 3:
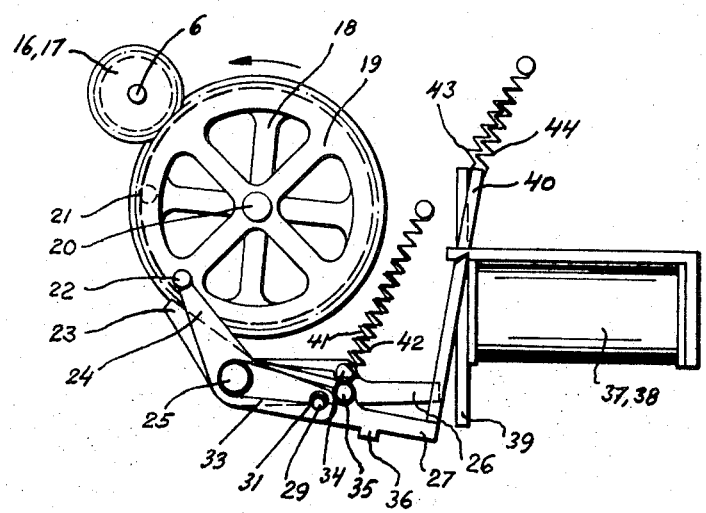
FIG. 3 shows the arrangement according to FIG. 2 during the proceeding exposure, the first roller blind part being released and the second roller blind part still being locked.

In FIG. 1 the curtain mechanism is in a position of proceeding exposure, at which the first curtain part 12 has been released and moved past some part of the film gate 2, the second curtain part 13 still being locked. The position of the locking mechanism at this occasion is shown in FIG. 3 where the upper mechanism part associated with the second curtain part 13 has not yet been released, while the lower mechanism part for the first curtain part 12 still has been released.

Upon actuation of the armature 39 for the electromagnet 37, the lever 26 is released. Thereby the spring 41 actuates and the catch 23 so as to release the stop pin 21. Owing to the traction of the spring-motor 15 on the drawing means 8, the drum 7 rotates on the inner axle (FIG. 1), and the first curtain part 12 is released. The gear ring 16 thereby drives the ratchet wheel 18 with the stop pin 21 in the direction indicated by the arrow (FIG. 3). The upper locking mechanism for the second curtain part 13 operates in a corresponding way when the electromagnet 38 pulls the armature 40.

Figure 4:
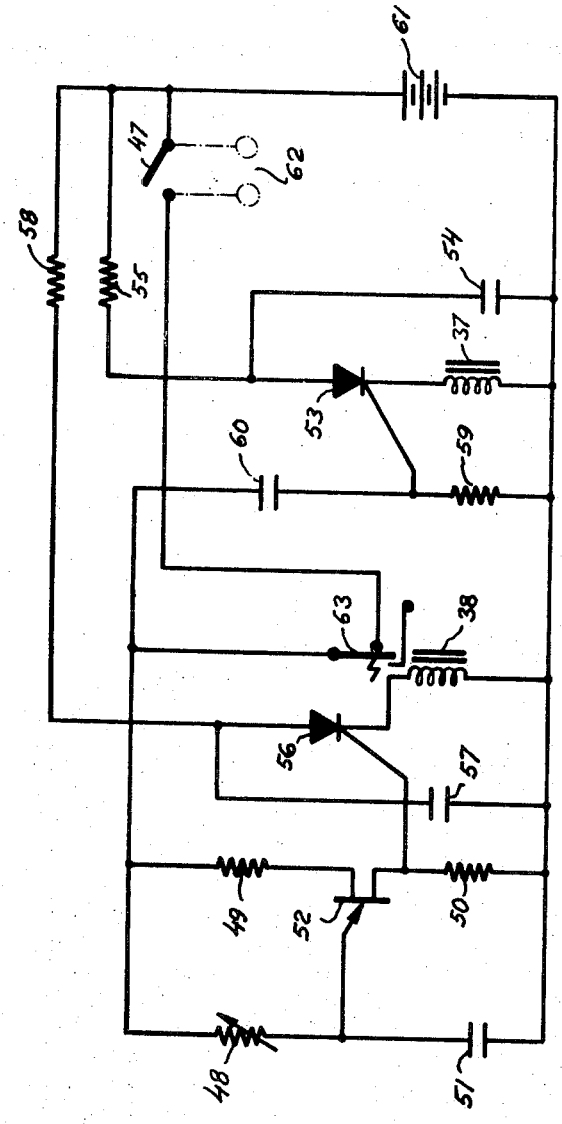
FIG. 4 shows the wiring diagram for the electronic circuits.

In the wiring diagram in FIG. 4, a switch 47 constitutes the switch which is controlled by the camera release button and closed at the exposure. The shutter, alternatively, can be released without actuation of the camera release button by connecting to the contact 62 an external switch adapted to be controlled manually or, for example, by a photocell or a microphone.

The timing circuit comprises a variable resistance 48, fixed resistances 49, 50, a capacitor 51 and a unijunction transistor (UJT) 52 where the value set on the resistance 48 determines the time delay and thereby the length of the shutter speed. Said circuit further comprises a switch 63 controlled by the electromagnet 38 for the release mechanism of the second curtain part, which switch for saving current interrupts the circuit when the second curtain part has been released.

The drive circuit for the electromagnet 37 of the first curtain part 12 comprises a thyristor 53, a capacitor 54 and a resistance 55. The drive circuit for the electromagnet 38 of the second curtain part 13 comprises a thyristor 56, a capacitor 57 and a resistance 58. The thyristor 53 is controlled by a resistance 59 and a capacitor 60. A current source 61 is, for example, a battery mounted in the camera. Upon closing of the switch 47, the first curtain part 12 is released and simultaneously the time circuit is started. The first curtain part 12 is released in that the initial inverse voltage obtained upon closing of the switch 47 is differentiated in the resistance 59 and capacitor 60, whereby the current pulse formed over the resistance 59 ignites the thyristor 53. The capacitor 54 then is discharged over the electromagnet 37, which thereby releases the locking mechanism. The capacitor 54 being discharged, the thyristor 53 is extinguished and the charging of the capacitor 54 again is started over the resistance 55. In the time circuit the charging of the capacitor 51 is started over the variable resistance 48 determining the shutter speed. The voltage having reached a threshold value determined by the transistor 52, the transistor is short-circuited transitorily, whereby the capacitor 51 is discharged. The current pulse then formed over the resistance 50 ignites the thyristor 56, whereby the capacitor 57 is discharged over the electromagnet 38, which then releases the locking mechanism for the second curtain part 13 and opens the switch 63. The capacitor 57 being discharged, the thyristor is extinguished and the charging of the capacitor 57 again is started over the resistance 58.

The charging of the capacitors 54, 57 over the resistances 55 and 58, respectively, is carried out with a limited current intensity, thereby saving the battery 61. At the same time, the capacity of the capacitors 54, 57 is sufficient to allow for safe operations of the electromagnets 37 and 38, respectively.

What I claim is:

1. In a camera shutter of the focal plane type having two curtain parts which in the cocked state of the shutter are separated by a preset gap corresponding to the fastest shutter speed and in which the two parts are individually released to permit their activation by a driving means with a time difference corresponding to the shutter speed, shutter control means comprising in combination:
   means for initiating shutter operation,
   first curtain release means responsive to operation of said initiating means for releasing said first curtain part,
   a time delay circuit,
   means responsive to operation of said initiating means for also starting a timing operation of said time delay circuit concurrently with operation of said first curtain release means,
   second curtain release means responsive to the completion of timing by said time delay circuit to release said second curtain part,
   a source of current for energizing said time delay circuit,
   and means responsive to actuation of said second curtain release means upon the completion of timing by said time delay circuit to interrupt the supply of current from said source to said time delay circuit,
   each said curtain release means including:
   a. an axle (6, 11) on which the curtain part is wound,
   b. a first gear (16, 17) rotatable with said axle,
   c. a second (18, 19) supporting a stop pin,
   d. a pivotable catch member (23, 24),
   e. a spring-biased release lever (26, 27),
   f. and electromagnetic curtain release means (37, 38),
   said release lever in the cocked state of the shutter abutting said stop pin so as to prevent rotation of said second gear, said first gear, and also said axle,
   said electromagnetic curtain release means upon its energization activating said release lever out of its said abutting position to permit rotation of said second gear, said first gear, and also said axle.

* * * * *